Patented Feb. 22, 1944

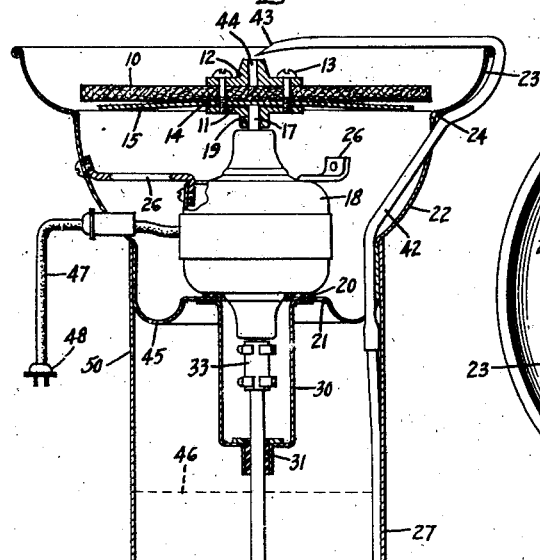
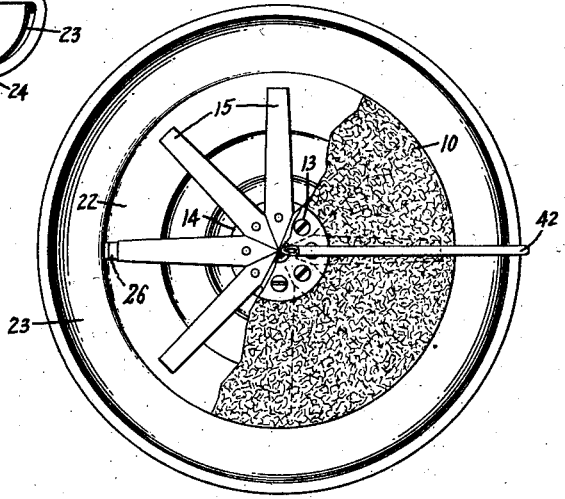
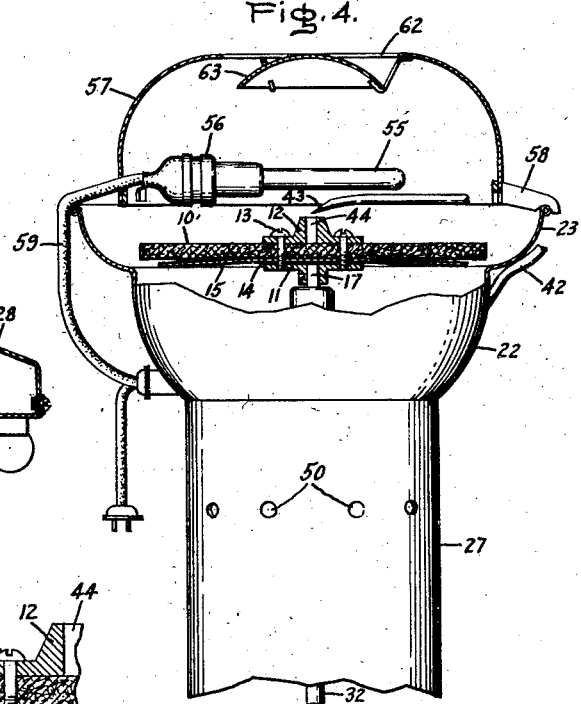
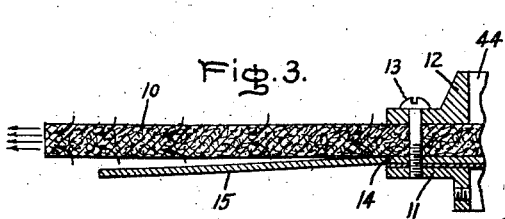
Inventor:
Osmund Holm-Hansen,
by Harry E. Dunham
His Attorney.

2,342,469

UNITED STATES PATENT OFFICE 2,342,469

ROOM AIR CONDITIONING UNIT

Osmund Holm-Hansen, Fairfield, Conn., assignor to General Electric Company, a corporation of New York Application December 18, 1941, Serial No. 423,500

4 Claims. (Cl. 261—34)

The invention relates to air conditioning and particularly to apparatus for circulating, cleaning, and humidifying the air in a room.

The principal object is to provide an improved, self-contained portable room air conditioning unit capable of creating a quiet and diffused centrally re-entrant, upward conical circulation of the air in the room so as to tend to equalize the temperature differential at the ceiling without producing objectionable air currents or drafts on the occupants while at the same time introducing moisture into the circulated air to overcome the effects of too dry air on the comfort and health of the occupants, as well as to prevent dehydration of furniture and other furnishings and in addition provide a combined filtering and air washing action tending to eliminate smoke, dust and dirt, also bacteria and plant pollen from the circulated air.

The above object is attained, in a preferred form of the present invention, by providing a spinner disk of porous hygroscopic material specially formed to draw air through both sides of the porous disk to obtain a filtering action by the centrifugal force produced on the air within the disk and rotatably mounting this spinner disk horizontally within an upwardly open bowl-like housing having a specially formed annular upwardly sloping concave rim for bending the centrifugal stream of filtered air discharged at relatively high velocity from the periphery of the disk into an upward conic stream directed towards the ceiling. As a result, the spinner disk produces a centrally re-entrant downward flow of air towards the axis of the disk within the upward conic stream. The bowl-like housing with the spinner disk mounted therein preferably is supported on a cylindrical tank that serves as a water reservoir with a suitable pumping means mounted therein and connected to be driven by a suitable spinner disk driving motor for supplying a small stream of water centrally to the upper side of the spinner disk. Due to the increasing hydrostatic forces developed during the resulting flow of water outwardly through the porous spinner disk, the water is thoroughly intermixed with and absorbed by the air inside the disk and the excess water becomes broken up into particles that are projected along with the filtered air stream from the periphery of the disk. The very fine water particles are carried along in the air stream as it is bent upwardly by the annular upwardly sloping concave rim of the bowl-like housing so as to enable these fine water particles to be dissipated into the room air. The annular upwardly sloping concave rim is specially formed to provide a circular riffle that lies just below the periphery of the porous spinner disk so that the larger particles of water thrown off from the disk will be intercepted and arrested by the concave rim and then subjected to the full force of the centrifugal stream of air discharged from the periphery of the disk as the water flows down across the circular riffle, thus producing an air washing action that still further increases the amount of water dissipated into the air. Preferably, an excess of water is supplied centrally to the disk so that the larger water particles will tend to wash particles of smoke, dust, dirt, and pollen or the like that are filtered from the air in its passage through the porous disk from the disk on to the concave rim of the housing. In this way a sufficient excess of water thrown off in large particles from the disk is able to carry these smoke, dust, dirt, or pollen particles filtered from the air over the circular riffle and into the water reservoir.

In the accompanying drawing illustrating the preferred embodiment of the present invention, Fig. 1 is a vertical section showing the general structural arrangement of the improved air conditioning unit; Fig. 2 is a top view with a section of the porous horizontal spinner disk broken away in order to show the downwardly inclined radial supporting arms at the under side of the disk; Fig. 3 is a diagram schematically showing the manner in which the air flows through the sides of the spinner disk 10 and is discharged at a relatively high peripheral velocity therefrom; and Fig. 4 shows a modification in which a sterilizing lamp is mounted above the spinner disk in order to provide a germicidal action on the spinner disk and the flow of air produced thereby.

As shown in Fig. 1, the horizontally mounted spinner disk 10 is formed of a porous hygroscopic material, preferably of a special fluffy form of porous felt to facilitate the flow of air therethrough. The central portion of the disk 10 is clamped between the opposing metal hubs 11 and 12 by means of the clamping screws 13. A washer 14 carrying a plurality of downwardly inclined radial supporting arms 15 preferably is interposed between the lower hub 11 and the disk so as to prevent excessive distortion of the fluffy felt spinner disk due to its weight when saturated with water with the disk stationary. The radial supporting arms 15 are inclined slightly downwardly in order to permit the free flow of air to an enlarged area of the under side of the disk when the disk becomes flattened out by centrifugal force upon rapid rotation thereof.

The lower clamping hub 11 is provided with a suitable axial bore for receiving the upwardly extending shaft 17 of the vertically mounted electric driving motor 18 with the hub 11 held in position on the shaft by means of the set screw 19. The electric driving motor 18 preferably is supported upon a resilient vibration absorbing pad 20 which rests upon the internally raised platform 21 formed in the bottom of the bowl-like housing 22 which surrounds the driving motor 18. This bowl-like housing 22 is provided with a specially formed outwardly extending concave rim 23 with the inner edge thereof joined to the top of the bowl-like housing 22 to form a circular riffle 24 disposed just below and closely adjacent to the periphery of the disk 10. The driving motor 18 is held vertically within the housing 22 by means of the three radially extending braces 26 so as to maintain the shaft 17 concentric with the circular riffle 24.

The bottom part of the bowl-like housing 22 preferably is of cylindrical form to telescope inside of the upper end of the cylindrical water tank 27 which is provided with an enlarged circular base 28 carrying the widely spaced apart mounting feet 29 to insure stability. A sleeve 30 extending downwardly from the raised platform 21 carries the bearing 31 for the drive shaft 32 which is connected by the coupling 33 to the lower end of the shaft 17 of the driving motor 18. This drive shaft 32 extends through a guiding diaphragm 34 and is connected by means of the flexible coupling 35 to drive the shaft 36 carrying the impeller 37 of the centrifugal pump 38 which is mounted in the bottom of the water tank 27 by means of the screws 39.

The outlet of the water pump 38 is connected to the pipe 41 which extends upwardly inside of the tank 27 to join with the humidifying water supply pipe 42. Pipe 42 passes outwardly through a suitable opening formed below the circular riffle 24 in the housing 22 and is then bent over the upper edge of the concave rim 23 and provided with a discharge spout 43 located directly above the supply water well 44 formed axially in the upper disk clamping hub 12. In this way water is pumped from the bottom of the tank 27 and supplied to the water well 44 from which it is absorbed into the porous spinner disk 10.

In operation, an adequate supply of water is poured into the housing 22 and passes through the openings 45 formed in the bottom of the housing 22 to fill the tank 27 to a suitable height as indicated by the dotted line 46. The electric driving motor 18 is connected to a suitable electric supply circuit through the flexible lead 47 and the plug 48 so as to drive the spinner disk 10 and the pump 38 at a relatively high speed. The rotation of the spinner disk 10 at relatively high speed discharges the air inside the disk from the periphery of the disk due to centrifugal action. This reduces the air pressure inside the disk below atmospheric so that air will flow into both sides of the disk as indicated diagrammatically by the arrows in Fig. 3. The resulting centrifugal air flow through the disk 10 becomes progressively stronger towards the periphery of the disk due to the progressively enlarged circular cross-sectional area of the disk as well as the increased centrifugal action as the air approaches the periphery. In this way the air is passed centrifugally through the disk and thereby subjected to a filtering action and then discharged in a relatively high velocity horizontal and centrifugal stream from the periphery of the disk 10. This high velocity horizontal and centrifugal air stream is then bent upwardly due to the concave upwardly sloping annular shape of the surrounding rim 23 which is located closely adjacent to the periphery of the disk 10. As a result the air flows upwardly in an expanding conical path towards the ceiling and a counterflow of air downwardly towards the axis of the disk 10 is induced.

A plurality of restricted air inlet openings 50 preferably are formed in the walls of the tank 27 to permit an additional flow of air into the tank to pass upwardly through the openings 45 in the bottom of the housing 22 around the motor 18 and into the lower side of the spinner disk 10. This additional flow of air serves to further increase the dissipation of water into the air as well as to cool the motor 18 and to maintain the proper high velocity centrifugal flow of air from the periphery of the disk 10. An inverted conical re-entrant air circulation is thus produced in the room by the high speed operation of the horizontal spinner disk 10 with practically no noise and without the occupants being subject to objectionably strong air currents or drafts. Such a forced air circulation tends to induce a generally diffused circulation of the air throughout the room that serves to reduce the temperature differential at the ceiling and also imparts more livable characteristics to the air in the room.

The operation of the pump 38 raises the water from the bottom of the tank 27 to discharge in a small stream from the spout 43 into the water well 44 on the upper side of the horizontal spinning disk 10. The water is absorbed from the well 44 into the central part of the spinner disk 10 and by centrifugal action is intimately mixed with the air flowing inside of the disk and projected along with the air from the periphery thereof. The finer particles of water are carried along with the upwardly bent air stream so as to be vaporized and dissipated therein. By a combination of capillary and centrifugal action, all parts of the disk 10 are maintained wetted so as to diffuse the maximum amount of water into the air. The excess water is discharged in larger particles that are intercepted by the concave rim 23 and thereby form an additional wetted surface from which an additional amount of water may be dissipated into the air. The excess water running down the inner surface of the concave rim 23 will be brought by the circular riffle 24 into intimate contact with the opposing high velocity circular stream of air discharged from the periphery of the disk 10 so as to set up a turbulent air washing action that materially increases the dissipation of the water into the air as well as the cleaning of the air. The excess water then flows over the riffle 24 and over the interior surface of the bowl-like housing 22 into the tank 27. Such excess flow of water likewise serves to wash the dirt and dust particles that are filtered from the air in its passage through the disk 10 from the disk into the tank 27.

The combined room air circulating, temperature equalizing, air filtering, air washing, and humidifying functions produced by the horizontal spinner disk 10 in combination with the other cooperating parts of the apparatus all serve to enhance the comfort and health of the occupants of the room and are obtained by means of the present invention with a relatively simple and efficient form of electric motor driven air conditioning apparatus.

Where the further benefits of germicidal action on the air are desired, the modification shown in Fig. 4 may be employed. In this modification, a germicidal lamp 55 is mounted in a socket 56 supported in a reflecting cover 57 which is of smaller diameter than the rim 23 and is provided with a plurality of outwardly extending arms 58 that rest on the edge of the rim 23. The lamp lead 59 is arranged to be plugged into the junction socket 60 so as to be energized from the same source as the driving motor 18. The cover 57 is provided with an enlarged central opening 62 for permitting the reentrant downward flow of air to the upper side of the spinner disk 10. An inner reflector hood 63 is provided to direct the germicidal rays from the lamp 55 towards the spinner disk 10. In this way both the direct and reflected rays from the lamp 55 are concentrated upon the spinner disk 10 so as to amplify their destructive action on germs carried in the air, dust or dirt through the disk. This germicidal action may be added whenever desired.

What I claim as new and desire to secure by Letters Patent of the United States, is:

1. An air conditioner having in combination an upwardly open housing having an annular upwardly sloping concave rim flaring outwardly at the top thereof to provide a circular water flow riffle below the top of said rim, a spinner disc formed of porous hygroscopic material for producing a centrifugal flow of air therethrough to filter said air flow, means for spinning said disc with the periphery thereof overlying said riffle to project said centrifugal air flow against said rim and thereby bend said centrifugal air flow upwardly, and means for supplying a flow of water centrally to said disc to wash and humidify said air flow through said disc and over said rim and counterflow excess water over said riffle into said housing.

2. An air conditioner having in combination a horizontal spinner disc formed of porous hygroscopic material for producing a centrifugal flow of air therethrough to filter said air flow, an upwardly open housing having an annular upwardly sloping concave rim flaring outwardly at the top thereof concentric with said disc and disposed around the periphery of said disc to bend said centrifugal air flow upwardly and provide a circular water flow riffle below the edge of said disc, and means for supplying a flow of water centrally to said disc to wash and humidify said air flow through said disc and over said rim and counterflow excess water over said riffle into said housing.

3. An air conditioner having in combination a horizontal spinner disc formed of porous hygroscopic material for producing a centrifugal flow of air therethrough to filter said air flow, an upwardly open housing having an annular upwardly sloping concave rim flaring outwardly at the top thereof and surrounding the periphery of said disc to bend said centrifugal air flow upwardly and to provide a circular water flow riffle below the edge of said disc, means including a pair of clamping hubs on opposite sides of said disc for driving said disc, and means including a well formed in the upper one of said hubs for supplying a flow of water centrally to the upper side of said spinner disc to wash and humidify said air flow through said disc and over said rim and counterflow excess water over said riffle into said housing.

4. A room air conditioning unit having in combination an upwardly open cylindrical water supply tank, an upwardly open bowl-like housing having a cylindrical bottom portion formed to telescope inside the top of said tank and having an annular upwardly sloping concave rim flaring outwardly at the top thereof to provide a circular water flow riffle below the top of said rim, a rotary pump mounted axially in said tank, an electric motor mounted coaxially in said housing and having a shaft operatively connected at the lower end with said pump and having the other end of said shaft extending upwardly concentric with said riffle, a spinner disc formed of porous hygroscopic material for producing a centrifugal flow of air therethrough to filter said air flow, means for mounting said disc on said upwardly extending end of said shaft with the periphery of said disc overlying said riffle to project said centrifugal flow of air against said rim to bend said air flow upwardly, and a water supply conduit extending from said pump outside and over said rim for supplying a flow of water centrally to the upper side of said disc to wash and humidify said air flow through said disc and over said rim and counterflow excess water over said riffle into said housing.

OSMUND HOLM-HANSEN.